Patented Mar. 9, 1926.

1,575,703

UNITED STATES PATENT OFFICE.

HELLMUTH MÜLLER-CLEMM, OF MANNHEIM-WALDHOF, GERMANY, ASSIGNOR TO THE FIRM OF GESELLSCHAFT FÜR CHEMISCHE PRODUKTION M. B. H., OF MANNHEIM-WALDHOF, GERMANY, A CORPORATION OF GERMANY.

PROCESS FOR THE MANUFACTURE OF A HIGHLY-ACTIVE DECOLORIZING CHARCOAL.

No Drawing.   Application filed May 2, 1924.   Serial No. 710,626.

*To all whom it may concern:*

Be it known that I, HELLMUTH MÜLLER-CLEMM, a citizen of the German Republic, residing at Mannheim-Waldhof, in the Republic of Germany, have invented certain new and useful Improvements in Processes for the Manufacture of a Highly-Active Decolorizing Charcoal, of which the following is a specification.

At present the manufacture of active charcoal is carried out by impregnating organic substances such as wood, sawdust, etc. with chemicals such as potash or chloride of zinc, or mixing molasses or sulphite waste liquor etc., with these chemicals and then heating the impregnated bodies or mixtures to bright red heat with the exclusion of air.

I have, however, discovered that charcoal of a considerably higher activity can be obtained from for example the above carbohydrate containing material by using as activating substance alkali sulphide or polysulphide in place of potash. This process is of special importance because when potash is used, a portion of the same is frequently converted by the calcining process into potassium sulphide or potassium polysulphides which hitherto have been submitted to carbonization for the purpose of their regeneration. Owing to the present process making it possible to use the mixture of alkali carbonates and sulphides direct, without carbonization, a much higher activity is obtained, with a saving of power, labour and material.

In some cases it is not even advantageous to use alkali sulphides or polysulphides without a certain amount of carbonate; this applies to cases when there is a salt of some metal present the sulphide of which is relatively soluble, such as for instance calcium sulphide. In such cases a certain quantity of carbonate is necessary for eliminating said salts. If pure alkali sulphide solutions are used in such a case the exact carbonate percentage required for precipitating the metal salts can be ensured by a moderate treatment with $CO_2$. In this case also the new process offers a considerable advantage over the old process of complete carbonization as in view of the unfavourable conditions of equilibrium between the weak carbonic acid and the sulphuretted hydrogen, it is just the elimination of the last traces of potassium sulphide (which is not necessary in the present case) that presents considerable difficulties.

In the application of the process to sulphite cellulose waste lye, a further development of the process has proved of the greatest value; which consists in introducing into the lye, after the addition of the alkali sulphide or alkali polysulphide solution, carbonic acid until the lime is precipitated, in removing the precipitate produced by filtration, in evaporating the filtrate and in further treating the residue by the process above described.

The process could be further developed by precipitating in the well known manner the organic substances contained in the sulphite cellulose waste lye, by dissolving the precipitate thus obtained with alkali sulphide or alkali polysulphide solution, except for the insoluble lime resides by evaporating to dryness the filtrate if desired after introducing carbonic acid and filtering again, and by carbonizing the dry residue.

The process could also be carried out by mixing the precipitated organic substance with the sulphide solution, by passing thereupon carbonic acid, preferably under pressure and with heating, until the lime is converted into carbonate, and by submitting the filtrate to further treatment in the manner already described.

*Example 1.*

1 cubic meter of sulphite waste lye is mixed with 32 kg. of potassium sulphide, evaporated to dryness and heated for several hours to bright red heat with the exclusion of air. The product of the carbonization is then quenched with water and lixiviated. The crude lye thus obtained can then be directly added again to a fresh quantity of sulphite waste lye, and evaporated.

*Example 2.*

Carbonic acid is introduced into 1 cubic meter of sulphite cellulose waste lye after the addition of a solution containing 32 kg. potassium sulphide, until the lime contained in the sulphite cellulose waste lye is precipitated. The precipitate is filtered off, the filtrate evaporated to dryness and the residue heated for several hours to bright red heat with the exclusion of air. The product of the carbonization is subsequently treated by the process described in the first example.

Example 3.

20 kg. calcium oxide are slaked with as little water as possible, and 1 cubic meter of sulphite cellulose waste lye is added with stirring. The mixture is heated in an autoclave for about an hour at a pressure of several atmospheres, and the precipitate obtained after that time is pressed out. The precipitate dehydrated to the greatest possible extent is mixed with a solution containing say 32 kg. potassium sulphide in the form of sulphide or polysulphide and boiled with stirring, owing to which the organic substance passes into solution. The lime in the solution is precipitated by the introduction of carbonic acid, and after a second filtering the filtrate is evaporated to dryness and carbonized with the exclusion of air as in the Examples 1 and 2.

Example 4.

As in the Example 3 sulphite cellulose waste lye is precipitated with lime. The precipitate pressed off is mixed in an autoclave with a solution of 32 kg. potassium sulphide, carbonic acid is introduced until the pressure reaches about 3 atmospheres, and the whole is heated to 130–150° C. After the cooling, the contents of the autoclave are filtered, and the filtrate treated as in the Example 3.

What I claim is:

1. The process of producing active carbon which comprises carbonizing carbonaceous material in the presence of an alkali metal sulphide.

2. The process of producing active carbon which comprises carbonizing carbonaceous material impregnated with an alkali metal sulphide.

3. The process of producing active carbon which comprises heating approximately for several hours at about a bright red heat carbonaceous material in the presence of an alkali metal sulphide.

4. The process of producing active carbon which comprises carbonizing carbonaceous material impregnated with an alkali metal sulphide by heating such a material at about a bright red heat.

5. The process of producing active carbon which comprises carbonizing carbonaceous material in the presence of an alkali metal sulphide and excluding air therefrom during the carbonizing operation.

6. The process of producing active carbon which comprises carbonizing carbonaceous material impregnated with an alkali metal sulphide and excluding air therefrom during the carbonizing operation.

7. The process of producing active carbon which comprises heating carbonaceous material in the presence of a potassium sulphide.

8. The process of producing active carbon which comprises heating carbonaceaus material in the presence of potassium sulphide excluding air during the carbonizing process.

9. The process of producing active carbon which comprises heating carbonaceous material in the presence of an alkali metal sulphide, excluding air, and separating soluble products from the carbonized product.

10. The process of producing active carbon which comprises carbonizing carbonaceous material in the presence of potassium sulphide at about bright red heat.

11. The process of producing active carbon which comprises carbonizing carbonaceous material in the presence of potassium sulphide at about bright red heat and excluding air during the operation.

12. The process of producing active carbon which comprises carbonizing carbonaceous material in the presence of potassium sulphide at about bright red heat, excluding air during the operation and lixiviating the carbonized product.

13. The process of producing active carbon which comprises impregnating carbohydrate containing material with an alkali metal sulphide and heating to the point of carbonization of the material.

14. The process of producing active carbon which comprises impregnating carbohydrate containing material, with an alkali metal sulphide and heating to the point of carbonization of the material and excluding air during the heating operation.

15. The process according to claim 14 in which the product is lixiviated with water.

In testimony whereof I have hereunto set my hand.

Dr. HELLMUTH MÜLLER-CLEMM.